US012705304B2

(12) United States Patent
Wang et al.

(10) Patent No.: US 12,705,304 B2
(45) Date of Patent: Aug. 11, 2026

(54) COMPUTER-IMPLEMENTED METHOD, DEVICE, AND COMPUTER PROGRAM PRODUCT FOR TRAINING A FEATURE EXTRACTION MODEL

(71) Applicant: EMC IP Holding Company LLC, Hopkinton, MA (US)

(72) Inventors: Zijia Wang, WeiFang (CN); Jiacheng Ni, Shanghai (CN); Wenbin Yang, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1078 days.

(21) Appl. No.: 17/406,451

(22) Filed: Aug. 19, 2021

(65) Prior Publication Data

US 2023/0034322 A1 Feb. 2, 2023

(30) Foreign Application Priority Data

Jul. 23, 2021 (CN) ........................ 202110837728.X

(51) Int. Cl.
*G06F 18/213* (2023.01)
*G06F 18/22* (2023.01)
(Continued)

(52) U.S. Cl.
CPC ............ *G06F 18/213* (2023.01); *G06F 18/22* (2023.01); *G06N 20/00* (2019.01)

(58) Field of Classification Search
None
See application file for complete search history.

(56) References Cited

U.S. PATENT DOCUMENTS

2017/0270653 A1* 9/2017 Garnavi .................. G06N 5/01
2020/0311574 A1* 10/2020 Andrade Silva ......... G06N 5/04
(Continued)

FOREIGN PATENT DOCUMENTS

CN 111191781 A 5/2020
CN 111242222 A 6/2020
(Continued)

OTHER PUBLICATIONS

H. Song et al., "Learning from Noisy Labels with Deep Neural Networks: A Survey," arXiv:2007.08199v5, Jun. 8, 2021, 18 pages.
(Continued)

*Primary Examiner* — Kamran Afshar
*Assistant Examiner* — Steven Phung
(74) *Attorney, Agent, or Firm* — Ryan, Mason & Lewis, LLP

(57) ABSTRACT

A method in an illustrative embodiment includes: determining, based on a set of sample features extracted from an input sample by a feature extraction model, a confidence level of the input sample and a similarity degree among the set of sample features; determining a first loss based on the confidence level, the set of sample features, and label information for the input sample, the first loss being related to the quality of the label information; determining a second loss based on the similarity degree among the set of sample features, the second loss being related to the quality of the set of sample features; and training the feature extraction model based on the first loss and the second loss.

20 Claims, 6 Drawing Sheets

(51) Int. Cl.

| | |
|---|---|
| ***G06N 3/045*** | (2023.01) |
| ***G06N 20/00*** | (2019.01) |
| ***G06V 10/42*** | (2022.01) |
| ***G06V 10/82*** | (2022.01) |

(56) References Cited

U.S. PATENT DOCUMENTS

| | | | | |
|---|---|---|---|---|
| 2020/0380359 | A1* | 12/2020 | Finnie | G06F 18/24 |
| 2021/0256420 | A1* | 8/2021 | Elisha | G06N 20/00 |
| 2022/0383152 | A1* | 12/2022 | Kallur Palli Kumar | G06N 3/044 |

FOREIGN PATENT DOCUMENTS

| | | | |
|---|---|---|---|
| CN | 111507419 | A | 8/2020 |
| CN | 111553399 | A | 8/2020 |

OTHER PUBLICATIONS

N. Natarajan et al., "Learning with Noisy Labels," Proceedings of the 26th International Conference on Neural Information Processing Systems—vol. 1, Dec. 2013, 9 pages.

Wikipedia, "Energy Minimization," https://en.wikipedia.org/wiki/Energy_minimization, Nov. 2, 2020, 8 pages.

Chinese Search Report of Application No. 202110837728.X dated Nov. 27, 2025, 3 pages.

* cited by examiner

400

```
Input  : Noisy dataset {z, y} ∈ D; T_0
Output: Robust model f_θ
Initialize   model parameters θ ;reweighting weights w^(1)
for t ← 1 to T do
    for each mini batch B do
        compute feature x
        compute distance d(eq 3)
        if t>T_0 then
            compute w^(t) based on the prediction results of t − 1 th step
        compute weighted cross-entropy loss L_cls
        compute potential energy loss l_PTM(eq 2)
        compute loss L^(t) (eq 5)
        update θ using back propagation
return
```

FIG. 4

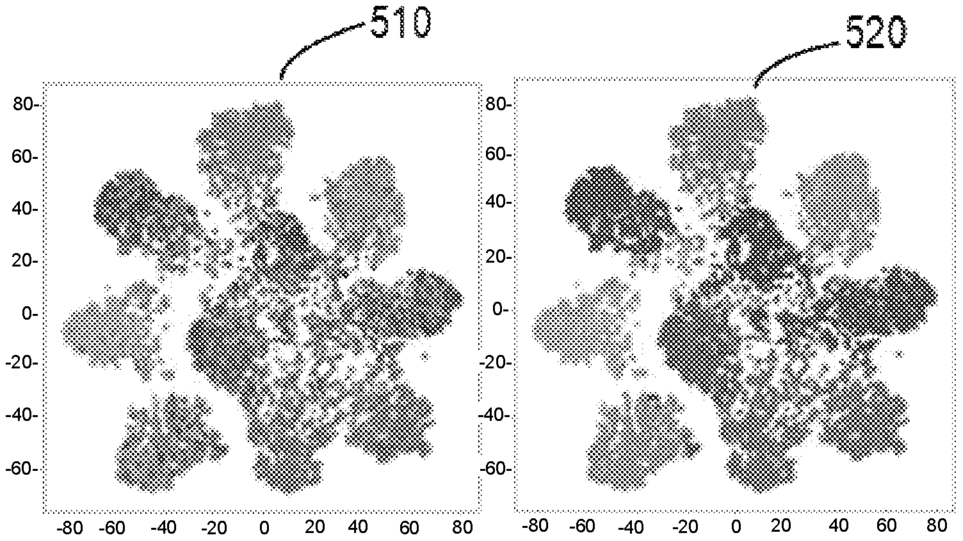
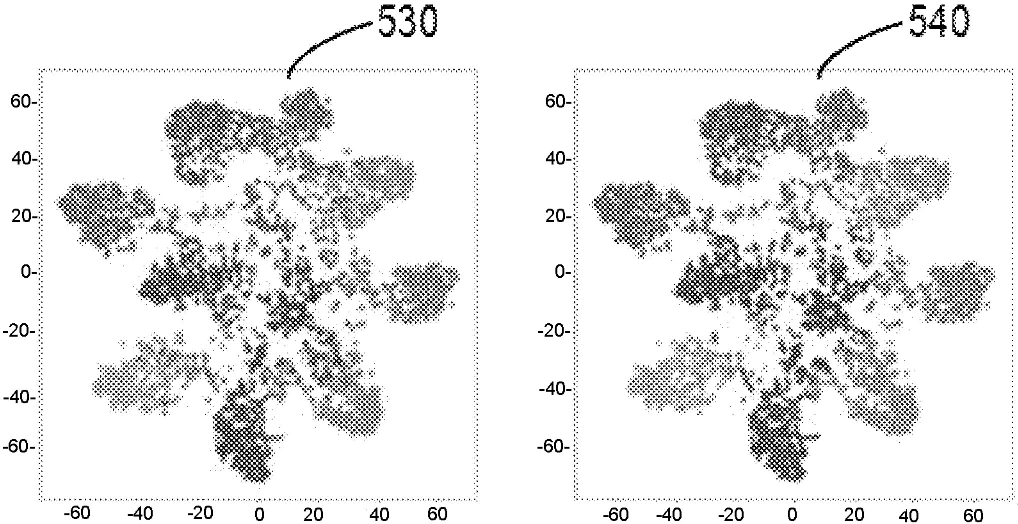
FIG. 5

COMPUTER-IMPLEMENTED METHOD, DEVICE, AND COMPUTER PROGRAM PRODUCT FOR TRAINING A FEATURE EXTRACTION MODEL

RELATED APPLICATION(S)

The present application claims priority to Chinese Patent Application No. 202110837728.X, filed Jul. 23, 2021, and entitled "Computer-Implemented Method, Device, and Computer Program Product," which is incorporated by reference herein in its entirety.

FIELD

Embodiments of the present disclosure relate generally to the field of computers and specifically to a computer-implemented method, a device, and a computer program product.

BACKGROUND

In the field of artificial intelligence, various techniques such as computer vision, information retrieval, and language processing have been significantly developed and have a wide range of applications. Before using a machine learning model, such as a neural network model, to process information, such as for image recognition, a large-scale dataset is often used to pre-train the machine learning model. Various methods have been proposed to train machine learning models using datasets, for example, a dataset with label information can be used to train a machine learning model. However, the accuracy of the obtained machine learning models needs to be further improved.

SUMMARY

Embodiments of the present disclosure provide a computer-implemented method, a device, and a computer program product.

In a first aspect of the present disclosure, a computer-implemented method is provided. The method includes: determining, based on a set of sample features extracted from an input sample by a feature extraction model, a confidence level of the input sample and a similarity degree among the set of sample features; determining a first loss based on the confidence level, the set of sample features, and label information for the input sample, the first loss being related to the quality of the label information; determining a second loss based on the similarity degree among the set of sample features, the second loss being related to the quality of the set of sample features; and training the feature extraction model based on the first loss and the second loss.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions including: determining, based on a set of sample features extracted from an input sample by a feature extraction model, a confidence level of the input sample and a similarity degree among the set of sample features; determining a first loss based on the confidence level, the set of sample features, and label information for the input sample, the first loss being related to the quality of the label information; determining a second loss based on the similarity degree among the set of sample features, the second loss being related to the quality of the set of sample features; and training the feature extraction model based on the first loss and the second loss.

In a third aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

This Summary is provided to introduce the selection of concepts in a simplified form, which will be further described in the Detailed Description below. The Summary is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent from the following description of example embodiments of the present disclosure with reference to the accompanying drawings, and in the example embodiments of the present disclosure, the same reference numerals generally represent the same components.

FIG. 4 illustrates an example training process for a feature extraction model according to some embodiments of the present disclosure;

FIG. 5 illustrates a schematic diagram of example output results of a feature extraction model according to some embodiments of the present disclosure versus output results of a conventional solution.

The same or corresponding reference numerals in the various drawings represent the same or corresponding portions.

DETAILED DESCRIPTION

Figure 1:
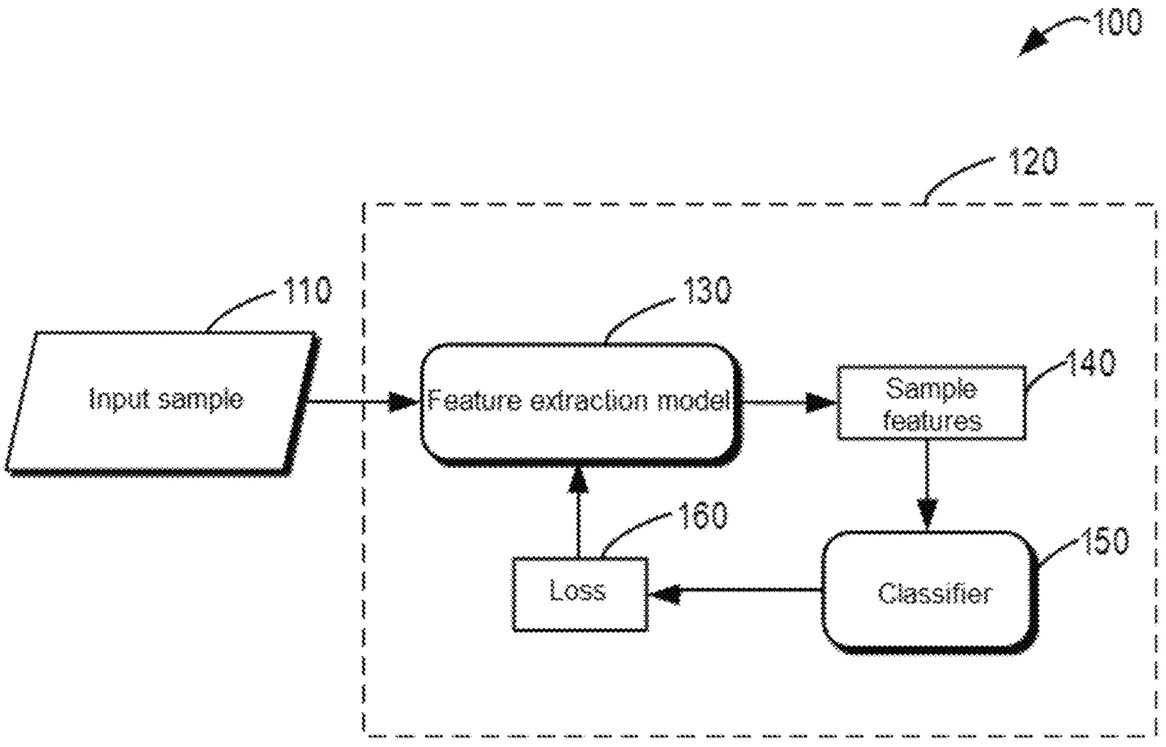
FIG. 1 illustrates a schematic block diagram of an example environment in which some embodiments according to the present disclosure can be implemented.

Illustrative embodiments of the present disclosure will be described in more detail below with reference to the accompanying drawings. While illustrative embodiments of the present disclosure are shown in the accompanying drawings, it should be understood that the present disclosure can be implemented in various forms without being limited to the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other definitions, both explicit and implicit, may be included below.

In the embodiments of the present disclosure, the term "model" is capable of processing inputs and providing corresponding outputs. A neural network model, for example, typically includes an input layer, an output layer, and one or more hidden layers between the input layer and the output layer. Models used in deep learning applications (also referred to as "deep learning models") typically include many hidden layers, thereby extending the depth of the network. The layers of the neural network model are sequentially connected so that an output of a previous layer is used as an input to the next layer, where the input layer receives the input to the neural network model and the output of the output layer is used as the final output of the neural network model. Each layer of the neural network model includes one or more nodes (also called processing nodes or neurons), each of which processes the input from the previous layer. Herein, the terms "neural network," "model," "network," and "neural network model" can be used interchangeably.

As described above, some solutions have been proposed to use datasets to train machine learning models, such as feature extraction models. In some conventional solutions, datasets with label information are often used to train machine learning models. For example, Amazon's Mechanical Turk™ dataset stores label information for the collected data, and this dataset can be used to train machine learning models. However, there are often mislabeled (also referred to as noisy labeled) data samples in the existing datasets. These noisy labeled data samples usually have a serious impact on the training of a model, and even cause the trained model to output feature values that do not match input samples.

To address the problem of noisy labeling, some solutions have been proposed to try to reduce the impact of noisy labeling on model training. For example, various sophisticated algorithms such as labeling refurbishment and fast adaptation have been used through supervised learning or semi-supervised learning to reduce the impact of noisy labeling. However, none of these solutions is able to improve the accuracy of the trained models very well. In addition, all of these solutions involve sophisticated algorithms that require large amounts of computation and require long processing times.

Embodiments of the present disclosure provide a computer-implemented method to solve one or more of the above problems and/or other potential problems. In this solution, based on a set of sample features extracted from an input sample by a feature extraction model, a similarity degree of the set of sample features and a confidence level of the input sample are determined. This solution further includes: determining a first loss related to the quality of label information for the input sample based at least on the confidence level; and determining a second loss related to the quality of the set of sample features based on the similarity degree among the set of sample features. The solution further includes: training the feature extraction model based on the determined first loss and second loss.

In this way, it is possible to take into account the confidence level of the input samples during the training process of the feature extraction model, and thus avoid that training results of the feature extraction model are affected by noisy labeled untrustworthy samples. In this way, the obtained feature extraction model can provide more accurate feature information.

The fundamental principles and several example embodiments of the present disclosure will be described in detail below with reference to the accompanying drawings.

FIG. 1 illustrates a schematic diagram of environment 100 for training a feature extraction model according to some embodiments of the present disclosure. It should be understood that the numbers and arrangement of entities, elements, and modules illustrated in FIG. 1 are examples only, and different numbers and different arrangements of entities, elements, and modules can be included in environment 100.

In environment 100 of FIG. 1, computing system 120 trains feature extraction model 130 based on input sample 110. Herein, input sample 110 may be a variety of types of input samples such as images, audio, video, and text. Input sample 110 may be a sample with label information. Feature extraction model 130 can use an untrained or trained machine learning-based model, such as an untrained or trained neural network model.

It should be understood that feature extraction model 130 can use other machine learning models. Feature extraction model 130 can be applied in a variety of fields. For example, in the field of machine vision, feature extraction model 130 can be used to extract feature information of images. In the field of information retrieval, feature extraction model 130 can be used to extract feature information for text, etc.

As shown in FIG. 1, in some embodiments, feature extraction model 130 outputs a set of sample features 140 based on input sample 110. For example, if input sample 110 is an image, the set of sample features 140 may be feature information for that image. The set of sample features 140 can be represented in the form of a vector, or may take other data forms. It should be understood that in some embodiments, feature extraction model 130 can also output more than one set of sample features 140 for input sample 110, each set of sample features 140 having certain similar features. For example, the output sets of sample features 140 may each have a different color feature.

The set of sample features 140 can be provided to classifier 150. In addition, label information for this input sample 110 can also be provided to the classifier (not shown in the figure). Classifier 150 can determine the confidence level of input sample 110 and the similarity degree of the set of sample features 140. Classifier 150 can also determine loss 160 according to a loss function based on information such as the confidence level of input sample 110 and the similarity degree of the set of sample features 140. The parameter of feature extraction model 130 can be adjusted by returning loss 160 to feature extraction model 130, thereby training feature extraction model 130.

Example environment 100 according to some embodiments of the present disclosure is described above in connection with FIG. 1. A flow chart of method 200 for training feature extraction model 130 according to some embodiments of the present disclosure will be described below with reference to FIG. 2. Method 200 can be implemented by computing system 120 of FIG. 1. It should be understood that method 200 can also be performed by other appropriate devices or apparatuses. Method 200 may include additional actions not shown and/or may omit actions shown, and the scope of the present disclosure is not limited in this regard. For ease of description, method 200 will be described with reference to FIG. 1.

Figure 2:
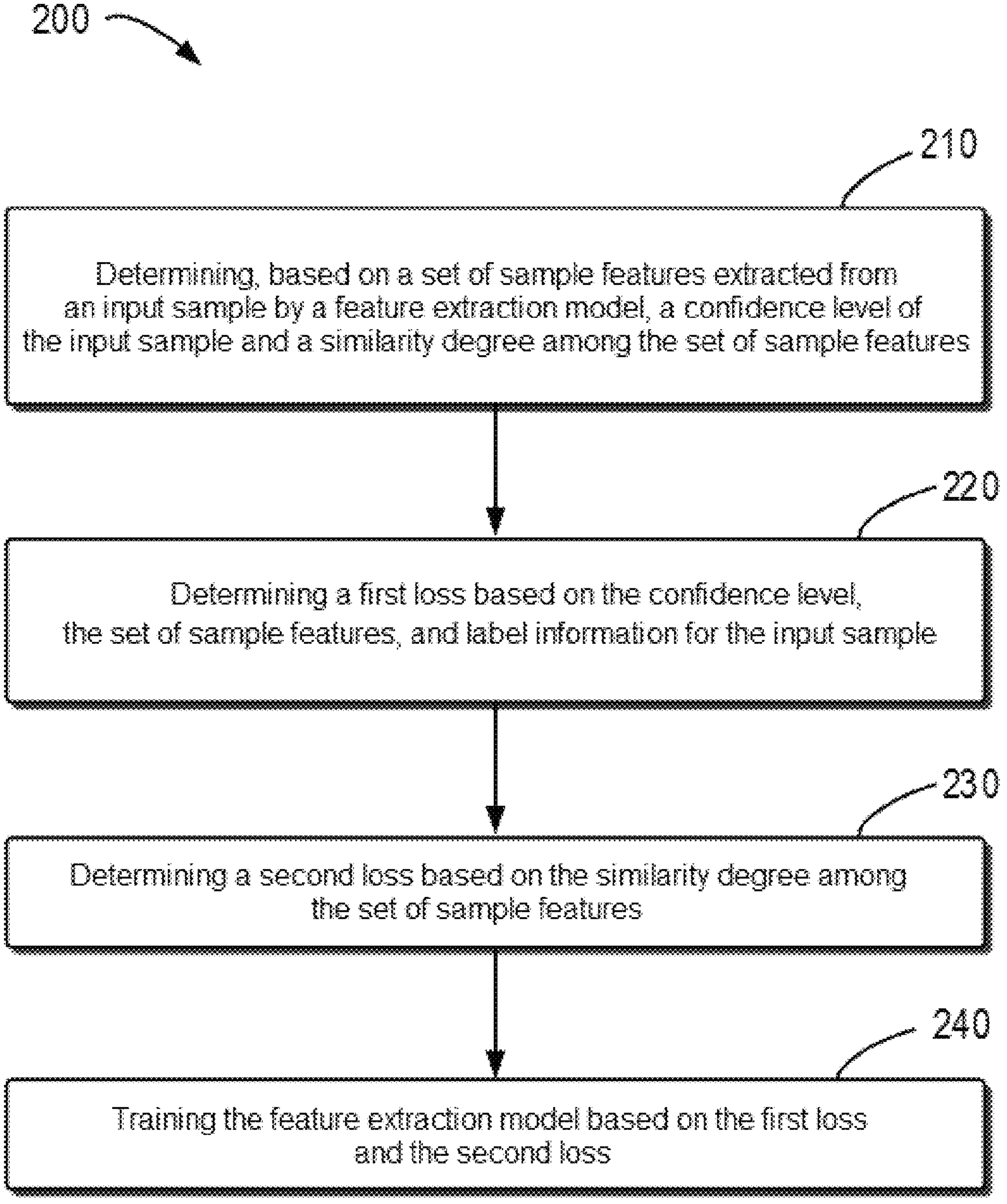
FIG. 2 illustrates a flow chart of an example computer-implemented method according to some embodiments of the present disclosure.

As shown in FIG. 2, at 210, computing system 120 determines, based on the set of sample features 140 extracted from input sample 110 by feature extraction model 130, a confidence level of input sample 110 and a similarity degree among the set of sample features 140. For example, computing system 120 can determine the similarity degree of the set of sample features 140 by calculating a sum of Euclidean distances between the sample features in the set of sample features 140. For example, when the sum of the Euclidean distances exceeds a certain threshold distance, a low similarity degree is indicated. In contrast, when the sum of the Euclidean distances does not exceed a certain threshold distance, a high similarity degree is indicated.

In some embodiments, based on this similarity degree, computing system 120 can determine a confidence level of input sample 110. For example, if the determined similarity degree is high, the confidence level of that input sample 110 is high; otherwise, the confidence level is low.

Additionally or alternatively, in some embodiments, based on a total similarity degree among points in feature space and the set of sample features 140, an aggregation point for the set of sample features 140 can be determined in the feature space. Having determined the aggregation point, an aggregated similarity degree between the set of sample features 140 and the aggregation point can then be determined.

Figure 3:
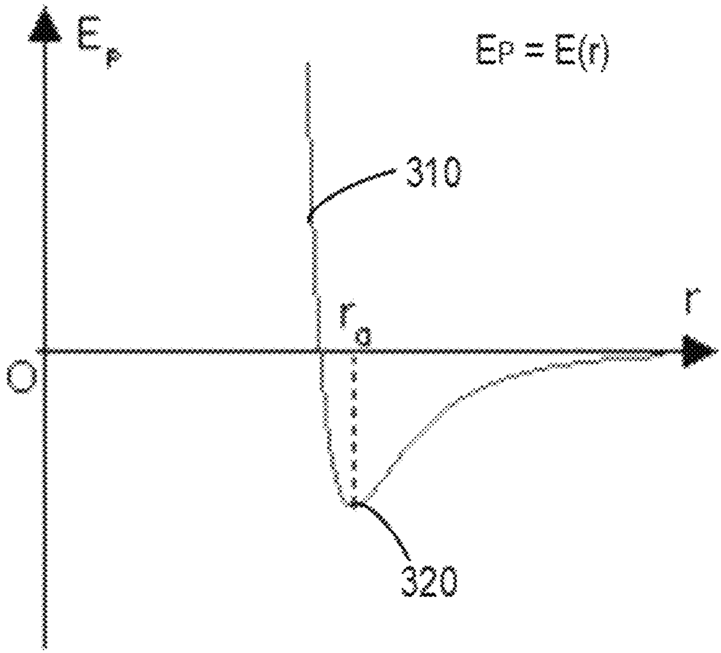
FIG. 3 illustrates a schematic diagram of a potential energy curve according to some embodiments of the present disclosure.

For example, the aggregation point for the set of sample features 140 can be determined by using a potential energy minimization (PEM) algorithm. FIG. 3 illustrates a schematic diagram of a potential energy curve according to some embodiments of the present disclosure. As shown in FIG. 3, on curve 310, the potential energy at 320 has a minimum value. When the potential energy has a minimum value, the corresponding distance $r_0$ is the most stable distance. The example curve of FIG. 3 can be used to calculate the potential energy E (or called $E_p$) using Equation (1).

$$E = \frac{1}{r^2} - \frac{1}{r^3} \tag{1}$$

In Equation (1), E denotes the potential energy and r denotes a distance between two molecules.

In combination with Equation (1), by applying the potential energy to the set of sample features 140, Equation (2) can be used to calculate a similarity degree of the set of sample features 140.

$$L_{PTM} = \sum_{i}^{N}\sum_{j}^{N-1}\left[\frac{1}{(d_{ij}+\lambda)^2} - \frac{1}{(d_{ij}+\lambda)^3}\right] \tag{2}$$

In Equation (2), $d_{ij}$ denotes two feature values in the set of sample features 140, such as a distance between $x_i$ and $x_j$, for example, a Euclidean distance. For two feature values in the same set of sample features 140, λ in Equation (2) can be set to a large value, for example, 1. For the case of a plurality of sets of sample features, when calculating the potential energy between two feature values belonging to different sets of sample features, λ can be set to a small value, such as 0. It should be understood that the example values 0 and 1 described above are only examples and do not limit the present disclosure in any way. $L_{PTM}$ in Equation (2) denotes a second loss function, which will be described in more detail below in connection with FIG. 2.

By using the potential energy calculation equation shown in Equation (2), an aggregation point c of the set of sample features 140 can be determined in the feature space using the PEM. This aggregation point c can minimize the total potential energy with respect to the set of sample features 140.

After determining the aggregation point c, the aggregated similarity degree (also referred to as distance) between the set of sample features 140 and the aggregation point c can be determined. In some embodiments, there may be a plurality of sets of sample features as well as a plurality of aggregation points. The aggregated similarity degree between one or more sets of sample features 140 and one or more aggregation points c can be determined by using Equation (3) and Equation (4).

$$d_{n,i} = \exp(-\|(x_n - c_i)\|_2) \tag{3}$$

In Equation (3), $x_n$ denotes the feature of input sample n, $c_i$ denotes the i-th aggregation point, exp(•) denotes an exponential function, and $d_{n,i}$ denotes the distance (or referred to as aggregated similarity degree) between the input sample n and the aggregation point $c_i$.

$$d_{n,i} = \frac{1}{\sum_{i=1}^{C_N}} \sum_{i=1}^{C_N} d_{i,n} N(c_i, I) \tag{4}$$

The distance $d_{n,i}$ of Equation (3) can be converted to the distance $d_{n,i}$ of Equation (4). In Equation (4), $C_N$ denotes the set of all aggregation points. N( . . . ) denotes the Gaussian distribution.

In some embodiments, the confidence level can be determined based on the aggregated similarity degree and the similarity degree threshold. For example, when the aggregated similarity degree (or distance) exceeds the similarity degree threshold, the confidence level is determined to be low. Conversely, when the aggregated similarity degree (or distance) does not exceed the similarity degree threshold, the confidence level is determined to be high. For example, the low confidence level can be set to 0 and the high confidence level can be set to 1. It should be understood that the confidence level can also be set to other appropriate values.

Additionally or alternatively, the confidence level can be calculated according to the aggregated similarity degree using, for example, a linear equation, for example, the confidence level can be set to 1 for a distance (also referred to as aggregated similarity degree) of 0, and the confidence level can be set to 0 for a distance (also referred to as aggregated similarity degree) of the similarity degree threshold. By setting the confidence levels of these two points, the confidence levels corresponding to other distances (or aggregated similarity degrees) can be calculated using the linear equation.

Additionally or alternatively, in some embodiments, classifier 150 may be a distance-based classifier. For example, classifier 150 can output a distance $d_{n,i}$ as determined by Equation (3) or Equation (4). Classifier 150 can also output the confidence level as described above. By using the distance-based classifier as described above, the classifier is interpretable, simple in structure, and easier to implement.

Returning to FIG. 2, at 220, computing system 120 determines a first loss based on the confidence level, the set of sample features 140, and label information of input sample 110. The first loss is related to the quality of the label information. It should be understood that the label information associated with input sample 110 may be a single piece of label information or a set of label information. The label information may be in the form of a vector, or in other similar data representation forms. For example, a cross-entropy function can be used to determine the first loss, where the confidence level may be used as the weight of this cross-entropy function.

At 230, computing system 120 determines a second loss based on the similarity degree among the set of sample features 140. The second loss is related to the quality of the set of sample features 140. For example, when the set of sample features 140 is more concentrated, i.e., when the similarity degree is high, a high quality of the set of sample features 140 is indicated. The set of sample features 140 having a high quality has a low second loss. For example, the second loss can be determined by calculating the total distance among the set of sample features 140. For another example, the second loss can be determined using Equation (2) as described above.

At 240, computing system 120 trains feature extraction model 130 based on the first loss and the second loss. For example, the total loss (i.e., loss 160) of the first loss and the second loss can be calculated by using Equation (5) below, and loss 160 can be returned to feature extraction model 130.

$$L^{(t)} = \sum_{n=1}^{B} w_n^{(t)} L_{clf}(x_n, y_n) + L_{PTM}(C) \tag{5}$$

In Equation (5), t denotes the number of iterations performed by feature extraction model 130, and $L^{(t)}$ denotes the total loss, i.e., loss 160, of the t-th iteration.

$$\omega_n^{(t)}$$

denotes the weight of the t-th iteration of input sample n, where this weight can be determined using the confidence level. $x_n$ denotes the extracted feature vector of input sample n, and $y_n$ denotes the label information of input sample n. $L_{clf}$ denotes the first loss function, which can be, for example, a function such as the mean square error. B denotes the total number of samples in a batch used in the t-th iteration, for example, 32 input samples can be selected as a batch for processing. The value $$\sum_{n=1}^{B} w_n^{(t)} L_{clf}(x_n, y_n)$$

obtained by the weighted first function is the first loss. $L_{PTM}(C)$ in Equation (5) denotes the second loss function that has been described in detail in Equation (2).

In some embodiments, the weight $$\omega_n^{(t)}$$

of the input sample n at the t-th iteration shown in Equation (5) can be determined by the confidence level determined in the previous iteration, i.e., the (t−1)th iteration. For example, if the confidence level of the input sample n is determined to be low in the previous iteration, the weight $$\omega_n^{(t)}$$

of the input sample n at the t-th iteration can be set to a low value, e.g., to 0.2. In contrast, if the confidence level of the input sample n is determined to be high in the previous iteration, the weight $$\omega_n^{(t)}$$

of the input sample n at the t-th iteration can be set to a high value, for example, to 0.8. It should be understood that the weight values listed above are only schematic and the weight can be set to any appropriate value.

It should be understood that when the label information is mislabeled information or noisy labeled information, its value calculated according to the first loss function in Equation (5) may be large. By applying a low weight to it as described above, the resulting value of the first loss that will be weighted can be made low. By doing so, the impact of the loss value of the mislabeled information or noisy labeled information on the training of feature extraction model 130 can be reduced.

In some embodiments, after loss 160 is provided to feature extraction model 130, the parameter of feature extraction model 130 can be adjusted so as to train feature extraction model 130. For example, the parameter of feature extraction model 130 can be adjusted by a back propagation method. Additionally or alternatively, the parameter of classifier 150 can also be adjusted using loss 160 so as to train classifier 150.

In this way, it is possible to take into account the confidence level of the input sample in loss 160 and to reduce the weight of the first loss corresponding to an untrustworthy input sample. By doing so, the impact of the first loss value of the mislabeled information or noisy labeled information on the training of feature extraction model 130 can be reduced. In such a way, feature extraction model 130 can be better trained. The obtained feature extraction model is able to derive more accurate feature values.

In addition, embodiments of the present disclosure use a distance-based, interpretable classifier. The model structure is simple and easy to use and optimize. In addition, the time required to run this classifier is very short, and is negligible compared to the time required to extract features by feature extraction model 130. The solution for training a feature extraction model of the present disclosure is simple in structure and easy to control, so it can be applied to different tasks. For example, it can be applied to image feature extraction, text feature extraction, language feature extraction, video feature extraction, and so on.

FIG. 4 illustrates example process 400 according to some embodiments of the present disclosure. As illustrated in FIG. 4, computing system 120 uses a noisy sample set {z, y}, where z denotes the input sample and y denotes the label information. The feature extraction model $f_\theta$ (i.e., feature extraction model 130) has a model parameter θ that has been initialized. The loss function has a weight $w^{(1)}$ that has been initialized. Feature extraction model 130 is trained through T times of iterated processes. T can be set to any appropriate integer value. In each iteration, a batch (the number thereof is B, which can be set to any appropriate integer value) of input samples is selected for processing.

For each batch, feature x is extracted by feature extraction model 130. The distance d is calculated by classifier 150 (which can also be other devices or components of computing system 120) according to Equation (3). The weight $w^{(t)}$ is updated according to the result of a previous iteration. The weighted cross-entropy loss is calculated based on $w^{(t)}$, and used as the first loss. The second loss is calculated according to Equation (2). The sum of the second loss and the second loss is calculated according to Equation (5), and used as loss 160. Based on loss 160, the parameter θ of feature extraction model 130 is updated using back propagation.

With the example process shown in FIG. 4, it is possible to take into account the confidence level of the input sample in loss 160 and to reduce the weight of the first loss corresponding to the untrustworthy input sample. By doing so, the impact of the first loss value of the mislabeled information or noisy labeled information on the training of feature extraction model 130 can be reduced. In such a way, feature extraction model 130 can be better trained. The obtained feature extraction model is able to derive more accurate feature values.

FIG. 5 illustrates a schematic diagram of example output results of a feature extraction model according to some embodiments of the present disclosure versus output results of a conventional solution. Result 510 in FIG. 5 is a feature extraction result obtained by the conventional solution using a dataset with noisy labeling, while result 520 is a feature extraction result obtained by the solution of the present disclosure using a dataset with noisy labeling. By comparing results 510 and 520, it can be seen that the feature extraction result obtained using the solution of the present disclosure can better discriminate between different features and produce more concentrated results.

Result 530 in FIG. 5 is a feature extraction result obtained by the conventional solution using a dataset with noise-free labeling, while result 540 is a feature extraction result obtained by the solution of the present disclosure using a dataset with noise-free labeling. By comparing results 530 and 540, it can be seen that the feature extraction result obtained using the solution of the present disclosure can better discriminate between different features and produce more concentrated results.

Table 1 shows the accuracy comparison of the results obtained using the conventional solution and the present solution after 20 and 200 generations of training, respectively, for datasets with different noise ratios. From Table 1, it can be seen that the feature extraction model trained using the present solution can produce more accurate feature extraction results. In particular, the accuracy of the feature extraction results obtained by the feature extraction model of the present solution is significantly improved after more generations of training, e.g., 200 generations.

TABLE 1

| Accuracy comparison | | |
|---|---|---|
| | 20 generations of training | 200 generations of training |
| Conventional solution, noise 5% | 89.52% | 90.35% |
| The present solution, noise 5% | 85.01% | 89.31% |

TABLE 1-continued

| Accuracy comparison | | |
|---|---|---|
| | 20 generations of training | 200 generations of training |
| Conventional solution, noise 25% | 84.00% | 78.14% |
| The present solution, noise 25% | 79.68% | 86.18% |
| Conventional solution, noise 50% | 75.36% | 52.18% |
| The present solution, noise 50% | 65.08% | 77.11% |

Figure 6:
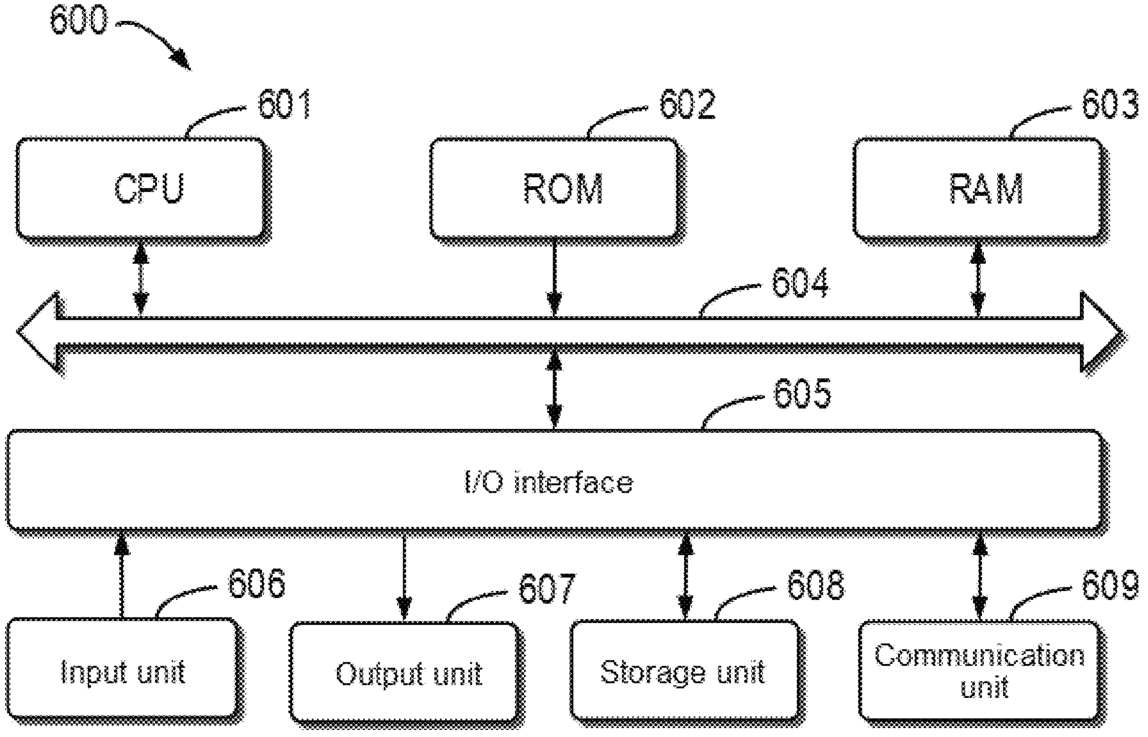
FIG. 6 illustrates a schematic block diagram of an example device that can be used to implement embodiments of the present disclosure.

FIG. 6 illustrates a schematic block diagram of example device 600 that can be used to implement the embodiments of the present disclosure. For example, computing system 120 as shown in FIG. 1 can be implemented by device 600. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. In some embodiments, input samples can be input to device 600 via input unit 606. Communication unit 609 allows device 600 to exchange information/data with other devices via a computer network, such as the Internet, and/or various telecommunication networks.

The various processes and processing described above, such as method 200 and/or process 400, may be performed by CPU 601. For example, in some embodiments, method 200 and/or process 400 may be implemented as a computer software program that is tangibly included in a machine-readable medium such as storage unit 608. In some embodiments, part or all of the computer program may be loaded and/or installed onto device 600 via ROM 602 and/or communication unit 609. When the computer program is loaded to RAM 603 and executed by CPU 601, one or more actions of method 200 and/or process 400 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object oriented programming languages, such as Smalltalk, C++, and the like, and conventional procedural programming languages, such as the "C" language or similar programming languages. The computer-readable program instructions may be executed entirely on a user computer, or partly on a user computer, or as a stand-alone software package, or partly on a user computer and partly on a remote computer, or entirely on a remote computer or server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A computer-implemented method, comprising:

determining, in a classifier of a processor-based machine learning system, based on a set of sample features extracted from an input sample by a feature extraction model implemented utilizing processor and memory resources of the processor-based machine learning system, a confidence level of the input sample and a similarity degree among the set of sample features, wherein the classifier has an input coupled to an output of the feature extraction model, and an output coupled to an input of the feature extraction model, the classifier being arranged in a feedback loop of the processor-based machine learning system between the output of the feature extraction model and the input of the feature extraction model;

determining, in the classifier of the processor-based machine learning system, a first loss based on the confidence level, the set of sample features, and label information for the input sample, the first loss being related to the quality of the label information;

determining, in the classifier of the processor-based machine learning system, a second loss based on the similarity degree among the set of sample features, the second loss being related to the quality of the set of sample features, wherein the second loss is computed, utilizing a potential energy function, by iteratively combining results of application of the potential energy function to respective pairs of feature values in the set of sample features; and training, via the feedback loop of the processor-based machine learning system, the feature extraction model based on the first loss and the second loss, the training taking into account confidence level and similarity degree for each of a plurality of samples including the input sample at least in part through weights assigned to respective ones of at least a subset of the plurality of samples in at least the first loss.

2. The method according to claim 1, further comprising:

determining, based on a total similarity degree among points in a feature space and the set of sample features, an aggregation point for the set of sample features in the feature space; and determining an aggregated similarity degree between the set of sample features and the aggregation point.

3. The method according to claim 2, further comprising:

determining the confidence level based on the aggregated similarity degree and a similarity degree threshold.

4. The method according to claim 1, further comprising:

training the classifier based on the first loss and the second loss.

5. The method according to claim 1, wherein the input sample comprises at least one of an image, audio, or video.

6. The method according to claim 1, wherein the first loss is determined utilizing a weighted cross-entropy function.

7. The method according to claim 1, wherein the potential energy function implements a difference between a first term having a squared variable in its denominator and a second term having a cubed variable in its denominator.

8. The method according to claim 1, wherein the confidence level is determined at least in part as a function of the similarity degree.

9. The method according to claim 8, wherein the confidence level is set to a first value responsive to an aggregated similarity degree being above a similarity degree threshold, and is set to a second value different than the first value responsive to the aggregated similarity degree being at or below the similarity degree threshold.

10. The method according to claim 8, wherein the function comprises a linear function between a first value of the confidence level corresponding to an aggregated similarity degree of zero and a second value of the confidence level corresponding to an aggregated similarity degree equal to a similarity degree threshold.

11. An electronic device, comprising:

at least one processor; and at least one memory storing computer program instructions, wherein the at least one memory and the computer program instructions are configured to cause, together with the at least one processor, the electronic device to perform actions comprising:

determining, in a classifier of a processor-based machine learning system, based on a set of sample features extracted from an input sample by a feature extraction model implemented utilizing processor and memory resources of the processor-based machine learning system, a confidence level of the input sample and a similarity degree among the set of sample features, wherein the classifier has an input coupled to an output of the feature extraction model, and an output coupled to an input of the feature extraction model, the classifier being arranged in a feedback loop of the processor-based machine learning system between the output of the feature extraction model and the input of the feature extraction model;

determining, in the classifier of the processor-based machine learning system, a first loss based on the confidence level, the set of sample features, and label information for the input sample, the first loss being related to the quality of the label information;

determining, in the classifier of the processor-based machine learning system, a second loss based on the similarity degree among the set of sample features, the second loss being related to the quality of the set of sample features, wherein the second loss is computed, utilizing a potential energy function, by iteratively combining results of application of the potential energy function to respective pairs of feature values in the set of sample features; and training, via the feedback loop of the processor-based machine learning system, the feature extraction model based on the first loss and the second loss, the training taking into account confidence level and similarity degree for each of a plurality of samples including the input sample at least in part through weights assigned to respective ones of at least a subset of the plurality of samples in at least the first loss.

12. The electronic device according to claim 11, wherein the actions further comprise:

determining, based on a total similarity degree among points in a feature space and the set of sample features, an aggregation point for the set of sample features in the feature space; and determining an aggregated similarity degree between the set of sample features and the aggregation point.

13. The electronic device according to claim 12, wherein the actions further include:

determining the confidence level based on the aggregated similarity degree and a similarity degree threshold.

14. The electronic device according to claim 11, wherein the actions further comprise:

training the classifier based on the first loss and the second loss.

15. The electronic device according to claim 11, wherein the input sample includes at least one of an image, audio, or video.

16. A computer program product tangibly stored on a non-volatile computer-readable medium and including machine-executable instructions, wherein the machine-executable instructions, when executed, cause a device to execute a method, the method comprising:

determining, in a classifier of a processor-based machine learning system, based on a set of sample features extracted from an input sample by a feature extraction model implemented utilizing processor and memory resources of the processor-based machine learning system, a confidence level of the input sample and a similarity degree among the set of sample features, wherein the classifier has an input coupled to an output of the feature extraction model, and an output coupled to an input of the feature extraction model, the classifier being arranged in a feedback loop of the processor-based machine learning system between the output of the feature extraction model and the input of the feature extraction model;

determining, in the classifier of the processor-based machine learning system, a first loss based on the confidence level, the set of sample features, and label information for the input sample, the first loss being related to the quality of the label information;

determining, in the classifier of the processor-based machine learning system, a second loss based on the similarity degree among the set of sample features, the second loss being related to the quality of the set of sample features, wherein the second loss is computed, utilizing a potential energy function, by iteratively combining results of application of the potential energy function to respective pairs of feature values in the set of sample features; and training, via the feedback loop of the processor-based machine learning system, the feature extraction model based on the first loss and the second loss, the training taking into account confidence level and similarity degree for each of a plurality of samples including the input sample at least in part through weights assigned to respective ones of at least a subset of the plurality of samples in at least the first loss.

17. The computer program product according to claim 16, wherein the method further comprises:

determining, based on a total similarity degree among points in a feature space and the set of sample features, an aggregation point for the set of sample features in the feature space; and determining an aggregated similarity degree between the set of sample features and the aggregation point.

18. The computer program product according to claim 17, wherein the method further comprises:

determining the confidence level based on the aggregated similarity degree and a similarity degree threshold.

19. The computer program product according to claim 16, wherein the method further comprises:

training the classifier based on the first loss and the second loss.

20. The computer program product according to claim 16, wherein the input sample comprises at least one of an image, audio, or video.

* * * * *